(12) United States Patent
Lu

(10) Patent No.: US 9,321,397 B2
(45) Date of Patent: Apr. 26, 2016

(54) FULL-SCREEN DISPLAY DEVICE OF AUTOMOBILE TAILLIGHTS

(71) Applicant: Zhanping Lu, Shandong (CN)

(72) Inventor: Zhanping Lu, Shandong (CN)

( * ) Notice: Subject to any disclaimer, the term of this patent is extended or adjusted under 35 U.S.C. 154(b) by 0 days.

(21) Appl. No.: 14/433,629

(22) PCT Filed: May 26, 2014

(86) PCT No.: PCT/CN2014/078465
§ 371 (c)(1),
(2) Date: Apr. 3, 2015

(87) PCT Pub. No.: WO2015/032222
PCT Pub. Date: Mar. 12, 2015

(65) Prior Publication Data
US 2015/0251591 A1    Sep. 10, 2015

(30) Foreign Application Priority Data

Sep. 8, 2013   (CN) .......................... 2013 1 0422095

(51) Int. Cl.
| | |
|---|---|
| *B60Q 1/26* | (2006.01) |
| *B60Q 1/30* | (2006.01) |
| *B60Q 1/00* | (2006.01) |
| *B60Q 1/22* | (2006.01) |
| *B60Q 1/34* | (2006.01) |

(52) U.S. Cl.
CPC ............... *B60Q 1/30* (2013.01); *B60Q 1/0076* (2013.01); *B60Q 1/0094* (2013.01); *B60Q 1/22* (2013.01); *B60Q 1/2607* (2013.01); *B60Q 1/34* (2013.01); *B60Q 2400/20* (2013.01)

(58) Field of Classification Search
USPC .............................. 315/77, 80; 307/10.1, 10.8
See application file for complete search history.

(56) References Cited

U.S. PATENT DOCUMENTS

| | | | | |
|---|---|---|---|---|
| 7,382,241 B1 * | 6/2008 | Huang | ..................... | B60Q 1/38 340/475 |
| 8,466,621 B2 * | 6/2013 | Pribula | ..................... | B60Q 1/28 307/10.8 |
| 2014/0062689 A1 * | 3/2014 | Huang | ................. | B60Q 1/2696 340/464 |

\* cited by examiner

*Primary Examiner* — Thuy Vinh Tran

(57) ABSTRACT

A full-screen display device of automobile taillights relates to a light-emitting display technology for automobile taillights, including left and right taillights, a linked switch and a light-emitting display controlling circuit. The left and the right taillights are divided into three light-emitting zones (I, II, and III), wherein light-emitting diodes (LEDs), respectively for displaying red, yellow and white light, are arranged in each light-emitting zone. The light-emitting display controlling circuit includes a signal inputting circuit, a single-chip microcomputer controlling circuit, a metal-oxide-semiconductor field-effect transistor (MOS FET) switching constant-current source circuit, a light-emitting executive circuit and a power source. The signal inputting circuit is connected with a signal inputting terminal of a single-chip microcomputer; a signal outputting terminal of the single-chip microcomputer is connected with an inputting terminal of the MOS FET switching constant-current source circuit; and the MOS FET switching constant-current source circuit is connected in series with the LEDs.

3 Claims, 3 Drawing Sheets

FULL-SCREEN DISPLAY DEVICE OF AUTOMOBILE TAILLIGHTS

CROSS REFERENCE OF RELATED APPLICATION

This is a U.S. National Stage under 35 U.S.C. 371 of the International Application PCT/CN2014/078465, filed May 26, 2014, which claims priority under 35 U.S.C. 119(a-d) to CN 201310422095.1, filed Sep. 8, 2013.

BACKGROUND OF THE PRESENT INVENTION

1. Field of Invention

The present invention relates to an automotive technology, and more particularly to a light-emitting display technology for automobile taillights.

2. Description of Related Arts

The conventional automobile taillights, no matter how the appearance changes, all display red when braking, yellow when steering and white when reversing as a traditional mode which composes a lighting language of the automobile taillights. The disadvantages of the conventional automobile taillights are that each screen is divided into a plurality of light-emitting zones and each light-emitting zone displays a fixed emitted color. Each taillight is divided into three fixed light-emitting zones, comprising a braking zone displaying red light, a steering zone displaying yellow light and a reversing zone displaying white light. When braking, only the braking zone displays red light and the other two zones do not display and are idle. When steering or reversing, the same as braking, two zones do not display and are idle. Thus, an effective display area of each taillight is small; a warning effect is bad; an overall light-emitting effect is bad; a probability of an accident is high; and the taillights are not beautiful.

For the above conventional taillights, multi-display light-emitting taillights are similar to the above single display light-emitting taillights. For example, when both reversing and braking, the reversing zone of each taillight displays white light and the braking zone displays red light. That is to say, only two zones display light and still a light-emitting zone is idle.

SUMMARY OF THE PRESENT INVENTION

An object of the present invention is to provide a full-screen display device of automobile taillights, which is controlled by a single-chip microcomputer program and displayed in a full-screen single display mode or a full-screen multi display mode. The light-emitting display effect of the present invention is better than the light-emitting display effect of the conventional technologies and is beautiful and striking; and the present invention is able to effectively avoid traffic accidents.

The technical solution of the present invention is to adopt a full-screen display device of automobile taillights, comprising left and right taillights, a linked switch allowing the taillights to display and a light-emitting display controlling circuit. Each of the left taillight 6 and the right taillight 7 is divided into three light-emitting zones, a first light-emitting zone I, a second light-emitting zone II and a third light-emitting zone III, wherein light-emitting diodes (LEDs), respectively for displaying red light, yellow light and white light, are arranged in each light-emitting zone. The light-emitting display controlling circuit comprises a signal inputting circuit 1, a single-chip microcomputer controlling circuit 2, a metal-oxide-semiconductor field-effect transistor (MOS FET) switching constant-current source circuit 3, a light-emitting executive circuit 4 and a power source 5. The signal inputting circuit 1 is connected with a signal inputting port of a single-chip microcomputer; a signal outputting port of the single-chip microcomputer is connected with an inputting terminal of the MOS FET switching constant-current source circuit 3; and the MOS FET switching constant-current source circuit is connected in series with the LEDs.

These and other objectives, features, and advantages of the present invention will become apparent from the following detailed description, the accompanying drawings, and the appended claims.

DETAILED DESCRIPTION OF THE PREFERRED EMBODIMENT

Figure 1:
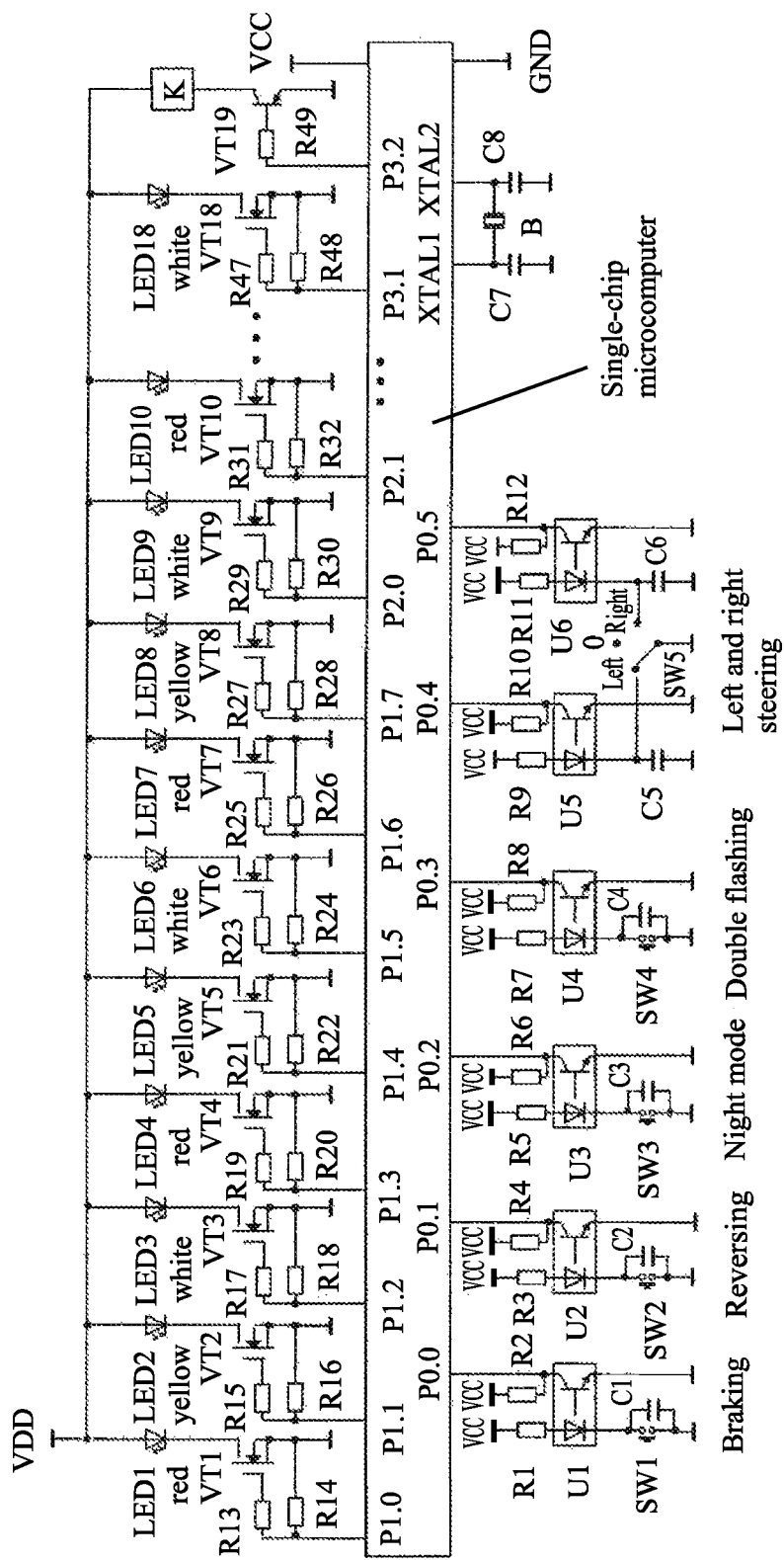
FIG. 1 is a circuit diagram of a full-screen display device of automobile taillights according to a preferred embodiment of the present invention.
Figure 2:
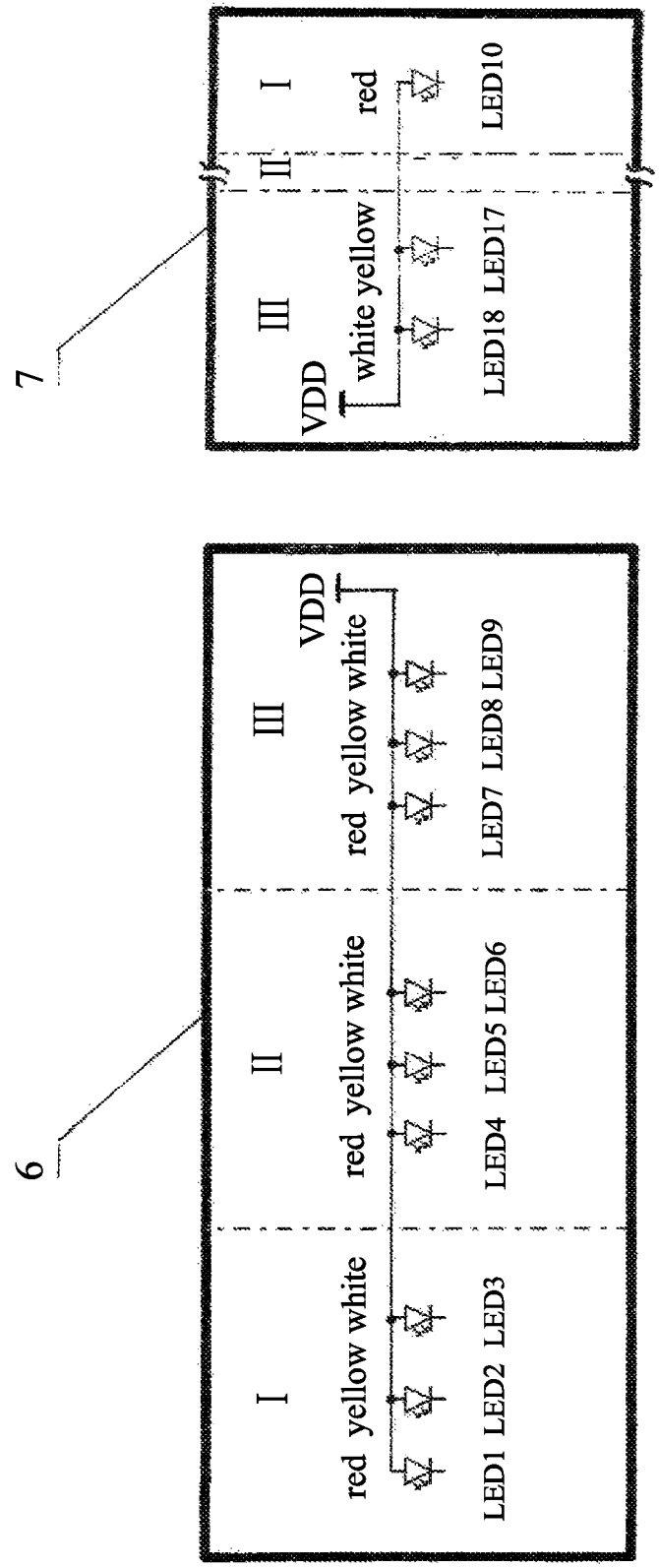
FIG. 2 is a sketch view of light-emitting diodes of left and right taillights according to the preferred embodiment of the present invention.
Figure 3:
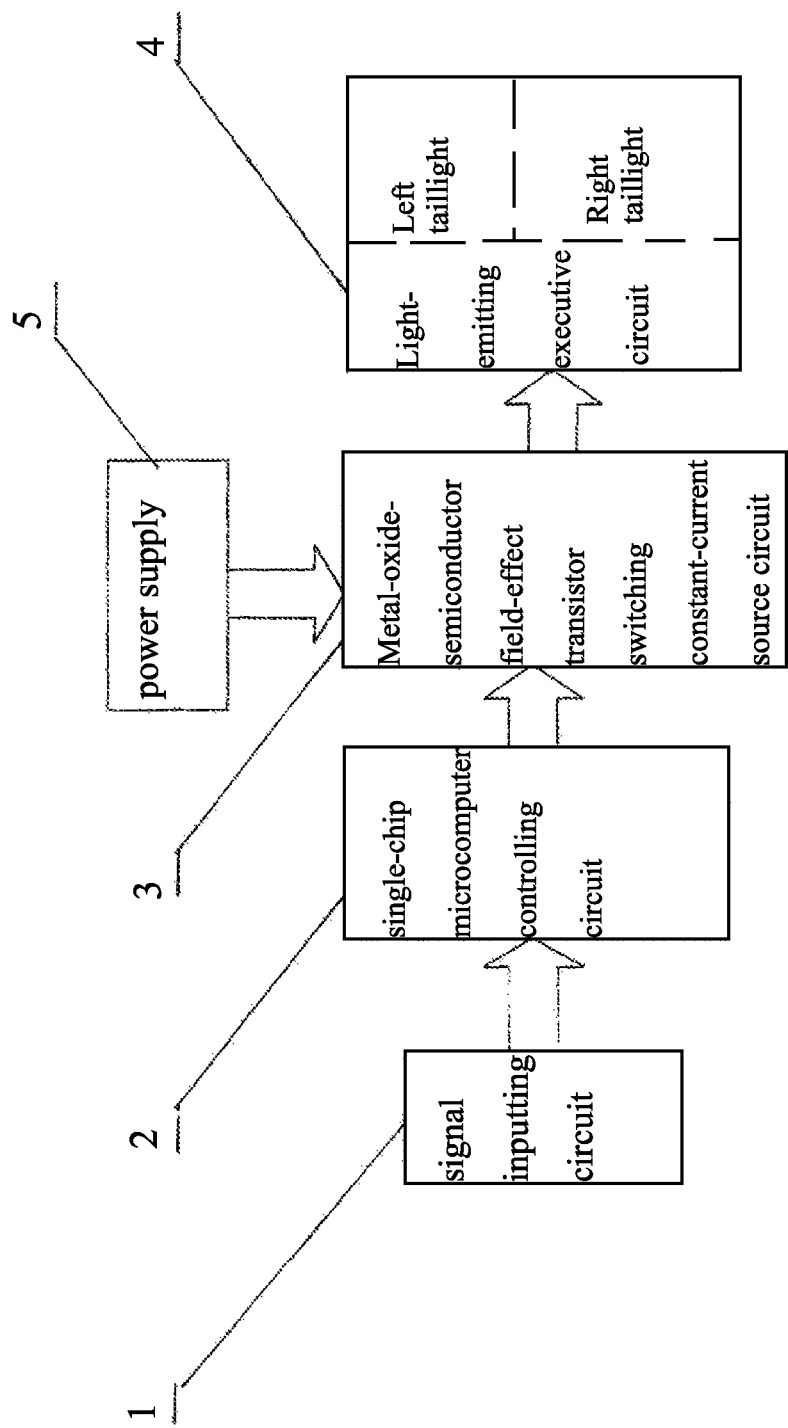
FIG. 3 is a block diagram of a light-emitting display controlling circuit according to the preferred embodiment of the present invention.

Referring to FIG. 1, FIG. 2 and FIG. 3 of the drawings, according to a preferred embodiment of the present invention, a full-screen display device of automobile taillights is illustrated, wherein the device comprises left and right taillights, a linked switch allowing the taillights to display and a light-emitting display controlling circuit. Each of the left taillight 6 and the right taillight 7 is divided into three light-emitting zones, a first light-emitting zone I, a second light-emitting zone II and a third light-emitting zone III, wherein light-emitting diodes (LEDs), respectively for displaying red light, yellow light and white light, are arranged in each light-emitting zone. The light-emitting display controlling circuit of the present invention comprises a signal inputting circuit 1, a single-chip microcomputer controlling circuit 2, a metal-oxide-semiconductor field-effect transistor (MOS FET) switching constant-current source circuit 3, a light-emitting executive circuit 4 and a power source 5. The signal inputting circuit 1 is connected with a signal inputting port of a single-chip microcomputer; a signal outputting port of the single-chip microcomputer is connected with an inputting terminal of the MOS FET switching constant-current source circuit 3; and the MOS FET switching constant-current source circuit is connected in series with the LEDs.

The detailed circuit construction is described as follows:

Switching buttons, which are linked with an automobile operating mechanism and output corresponding signals, are successively defined as "braking", "reversing", "night mode (hand switch)", "double flashing" and "left and right steering". Switching button signals generated by the switching buttons, respectively through a first optical coupler U1, a second optical coupler U2, a third optical coupler U3, a fourth optical coupler U4, a fifth optical coupler U5 and a sixth optical couple U6, are successively connected with a first inputting terminal P0.0, a second inputting terminal P0.1, a third inputting terminal P0.2, a fourth inputting terminal P0.3, a fifth inputting terminal P0.4 and a sixth inputting terminal P0.5 of an inputting port P0 of the single-chip microcomputer.

A first outputting terminal to an eighth outputting terminal P1.0-P1.7 of a first outputting port P1 and a first outputting terminal P2.0 of a second outputting port P2 of the single-chip microcomputer are successively connected with gate electrode circuits of a first MOS FET VT1 to a ninth MOS FET VT9 of the MOS FET switching constant-current source circuit. Drain electrodes of the first MOS FET VT1 to the ninth MOS FET VT9 of the MOS FET switching constant-current source circuit are successively connected in series with a first LED LED1 to a ninth LED LED9, in the left taillight 6. An emitted color order of the first LED LED1 to the ninth LED LED9 is successively red, yellow, white, red, yellow, white, red, yellow and white, wherein:

the first LED LED1 to the third LED LED3 respectively for displaying red, yellow and white light, are arranged in the first light-emitting zone I;

the fourth LED LED4 to the sixth LED LED6 respectively for displaying red, yellow and white light, are arranged in the second light-emitting zone II; and the seventh LED LED7 to the ninth LED LED9 respectively for displaying red, yellow and white light, are arranged in the third light-emitting zone III.

A second outputting terminal P2.1 to an eighth outputting terminal P2.7 of the second outputting port P2 and a first outputting terminal P3.0 to a second outputting terminal P3.1 of a third outputting port P3 of the single-chip microcomputer are successively connected with gate electrode circuits of a tenth MOS FET VT10 to an eighteenth MOS FET VT18 of the MOS FET switching constant-current source circuit. Drain electrodes of the tenth MOS FET VT10 to the eighteenth MOS FET VT18 of the MOS FET switching constant-current source circuit are successively connected in series with a tenth LED LED10 to an eighteenth LED LED18 in the right taillight 7. An emitted color order of the tenth LED LED10 to the eighteenth LED LED18 is successively red, yellow, white, red, yellow, white, red, yellow and white, wherein:

the tenth LED LED10 to the twelfth LED LED12, respectively for displaying red, yellow and white light, are arranged in the first light-emitting zone I of the right taillight (arranged from right to left);

the thirteenth LED LED13 to the fifteenth LED LED15, respectively for displaying red, yellow and white light, are arranged in the second light-emitting zone II of the right taillight (arranged from right to left); and the sixteenth LED LED16 to the eighteenth LED LED18, respectively for displaying red, yellow and white light, are arranged in the third light-emitting zone III of the right taillight (arranged from right to left).

The single-chip microcomputer of the present invention is further connected with a sound circuit, wherein:

a third outputting terminal P3.2 of the third outputting port P3 of the single-chip microcomputer is connected with a base inputting terminal of a triode switching circuit VT19; and a collector outputting terminal of the triode switching circuit is connected in series with a sound relay K.

The single-chip microcomputer of the present invention is internally provided with a pulse width modulation (PWM) circuit, wherein width modulation pulse signals of the PWM circuit are connected with the gate electrode inputting terminals of the MOS FET switching constant-current source circuit 3, namely the gate electrode circuits of the MOS FET switching constant-current source circuit, through the outputting terminals of the single-chip microcomputer. Or alternatively, the single-chip microcomputer of the present invention is a universal one which accomplishes the PWM via a program thereof.

The full-screen display device, according to the preferred embodiment of the present invention, has the following light-emitting display functions.

(1) Single Function-Braking

The switching button "braking" SW1 is pressed; then the first optical coupler U1 is switched on; the first inputting terminal P0.0 of the single-chip microcomputer is at a low level 0 and is effective. The other buttons are not pressed; the second inputting terminal P0.1, the third inputting terminal P0.2, the fourth inputting terminal P0.3, the fifth inputting terminal P0.4 and the sixth inputting terminal P0.5 of the single-chip microcomputer are at a high level 1; the first outputting terminal P1.0, the fourth outputting terminal P1.3 and the seventh outputting terminal P1.6 of the first outputting port P1 of the single-chip microcomputer output width modulation pulses, which respectively trigger the first MOS FET VT1, the fourth MOS FET VT4 and the seventh MOS FET VT7 to be switched on; then the first LED LED1, the fourth LED LED4 and the seventh LED LED7 in the first light-emitting zone I, the second light-emitting zone II and the third light-emitting zone III of the left taillight are switched on and the three light-emitting zones of the left taillight display red light; and a full-screen of the left taillight displays red light.

The second outputting terminal P2.1, the fifth outputting terminal P2.4 and the eighth outputting terminal P2.7 of the second outputting port P2 of the single-chip microcomputer output the width modulation pulses, which respectively trigger the tenth MOS FET VT10, the thirteenth MOS FET VT13 and the sixteenth MOS FET VT16 to be switched on; then the tenth MOS FET LED10, the thirteenth MOS FET LED13 and the sixteenth MOS FET LED16 in the first light-emitting zone I, the second light-emitting zone II and the third light-emitting zone III of the right taillight are switched on and the three light-emitting zones of the right taillight display red light; and a full-screen of the right taillight displays red light.

Accordingly, the full-screens of the left and the right taillights display red light when the full-screen display device implements the single function at braking.

(2) Single Function-Reversing

The full-screens of the left and the right taillights display white light when the full-screen display device implements the single function at reversing, under the same principles with the above single function at braking.

(3) Single Function-Steering

The switching button "left and right steering" SW5 is flipped to realize a flashing display respectively for left steering and right steering. When the switching button "left and right steering" SW5 is flipped for the left steering, the fifth optical coupler U5 is switched on and the fifth inputting terminal P0.4 of the single-chip microcomputer is at the low level 0 and is effective. The other buttons are not pressed; the second inputting terminal P0.1, the third inputting terminal P0.2, the fourth inputting terminal P0.3, the fifth inputting terminal P0.4 and the sixth inputting terminal P0.5 are all at the high level 1; and the second outputting terminal P1.1, the fifth outputting terminal P1.4 and the eighth outputting terminal P1.7 of the first outputting port P1 of the single-chip microcomputer output the width modulation pulses; meanwhile, by setting the program of the single-chip microcomputer, the width modulation pulses are outputted intermittently through the first outputting port P1, wherein a frequency of the intermittent outputting is 1 HZ and a duty ratio is 0.5. The width modulation pulses respectively trigger the second MOS FET VT2, the fifth MOS FET VT5 and the eighth MOS FET VT8 intermittently to be switched on intermittently; then the second LED LED2, the fifth LED LED5 and the eighth LED LED8 for displaying yellow light in the first light-emitting zone I, the second light-emitting zone II and the third light-emitting III of the left taillight are switched on intermittently; and the three light-emitting zones of the left taillight all display yellow light, namely the full-screen of the left taillight displays yellow light.

When the switching button "left and right steering" SW5 is flipped for the right steering, the single-chip microcomputer outputs the width modulation pulses through the third outputting terminal P2.2 and the sixth outputting terminal P2.5 of the second outputting port P2, and through the first outputting terminal P3.0 of the third outputting port P3. According to the program settings of the software, the width modulation pulses are outputted intermittently by the second outputting port P2 and intermittently trigger the eleventh MOS FET VT11, the fourteenth MOS FET VT14 and the seventeenth MOS FET VT17 to be switched on intermittently; then the eleventh LED LED11, the fourteenth LED LED14 and the seventeenth LED LED17 for displaying yellow light in the first light-emitting zone I, the second light-emitting zone II and the third light-emitting zone III of the right taillight are switched on intermittently; and the three light-emitting zones of the right taillight all display yellow light, namely the full-screen of the right taillight displays yellow light.

When steering, a low-frequency oscillating pulse, whose frequency is 1 HZ and duty ratio is 0.5, is outputted to the triode switching circuit VT19 by the third outputting terminal P3.2 of the third outputting port P3, in such a manner that the triode switching circuit VT19 is switched between on and off states constantly and the load relay K constantly sends out a beep.

(4) Combined Functions—Reversing and Braking

The switching button "reversing" SW2 is pressed; then the second optical coupler U2 is switched on; and the second inputting terminal P0.1 of the single-chip microcomputer is at the low level 0 and is effective. The switching button "braking" SW1 is pressed; then the second optical coupler U1 is switched on; and the first inputting terminal P0.0 of the single-chip microcomputer is at the low level 0 and is effective. The other buttons are not pressed; the third inputting terminal P0.2, the fourth inputting terminal P0.3, the fifth inputting terminal P0.4 and the sixth inputting terminal P0.5 are all at the high level 1. The first outputting terminal P2.0 of the second outputting port P2 and the second outputting terminal P3.1 of the third outputting port P3 of the single-chip microcomputer output the width modulation pulses, which respectively trigger the ninth MOS FET VT9 and the eighteenth MOS FET VT18 to be switched on; and then the ninth LED LED9 for displaying white light in the third light-emitting zone III of the left taillight and the eighteenth LED LED18 for displaying white light in the third light-emitting zone III of the right taillight are switched on and display white light. Meanwhile, the first outputting terminal P1.0 and the fourth outputting terminal P1.3 of the first outputting port P1 and the second outputting terminal P2.1 and the fifth outputting terminal P2.4 of the second outputting port P2 of the single-chip microcomputer output the width modulation pulses, which respectively trigger the first MOS FET VT1, the fourth MOS FET VT4, the tenth MOS FET VT10 and the fourth MOS FET VT14 to be switched on, and the first light-emitting zone I and the second light-emitting zone II of both the left and the right taillights display red light.

(5) Low-Light Indicating Function at Night

The switching button "night mode" SW3 is pressed. Herein, a PWM outputting of the single-chip microcomputer changes the duty ratio of the width modulation pulses, as determined by the program, and then further changes a conducting time of each MOS FET switching constant-current source circuit. Thus, a current intensity of each LED is also changed and brightness thereof is reduced.

The full-screen display device has other single function and other combined functions under the same principles as mentioned above.

INDUSTRIAL UTILITY

The present invention has a reasonable structure, and is suitable for processing and manufacture. The present invention is also suitable for mass production, and can be directly applied into conventional automobiles without any change in structures. Emitted colors and brightness of each light-emitting zone of the left and the right taillights are variable under a control by the single-chip microcomputer program. For example, when the single function is chosen, i.e., the braking, the steering or the reversing, the three light-emitting zones all display red, yellow or white light and no light-emitting zone is idle, which makes a full use of an effective light-emitting display area of each taillight; a light-emitting display effect is the best; the light-emitting display is beautiful and striking. When the combined functions are chosen, the three light-emitting zones are all used and no light-emitting zone is idle. When the driving indicating function at night is implemented, the brightness of the full-screen display is reduced reasonably by the PWM of the single-chip microcomputer. Due to the clear and intuitional light-emitting display effect, the present invention is liable to attract attentions of drivers and passengers and able to reduce traffic accidents effectively.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A full-screen display device of automobile taillights, comprising left and right taillights, a linked switch and a light-emitting display controlling circuit, wherein:

said left taillight and said right taillight are respectively divided into a first light-emitting zone (I), a second light-emitting zone (II) and a third light-emitting zone (III), wherein light-emitting diodes (LEDs), respectively for displaying red light, yellow light and white light, are arranged in each said light-emitting zone;

said light-emitting display controlling circuit comprises a signal inputting circuit, a single-chip microcomputer, a metal-oxide-semiconductor field-effect transistor (MOS FET) switching constant-current source circuit, a light-emitting executive circuit and a power source, wherein:

said signal inputting circuit is connected with a signal inputting terminal of said single-chip microcomputer; a signal outputting terminal of said single-chip microcomputer is connected with an inputting terminal of said MOS FET switching constant-current source circuit; and said MOS FET switching constant-current source circuit is connected in series with said LEDs;

said linked switch comprises linked switching buttons, wherein: said linked switching buttons, which are linked with an automobile operating mechanism and output corresponding signals, are successively defined as "braking", "reversing", "night mode (hand switch)", "double flashing" and "left and right steering";

switching button signals generated by said linked switching buttons, respectively through a first optical coupler, a second optical coupler, a third optical coupler, a fourth optical coupler, a fifth optical coupler and a sixth optical coupler (U1, U2, U3, U4, U5, and U6), are successively connected with a first inputting terminal, a second inputting terminal, a third inputting terminal, a fourth inputting terminal, a fifth inputting terminal and a sixth inputting terminal (P0.0, P0.1, P0.2, P0.3, P0.4, and P0.5) of an inputting port (P0) of said single-chip microcomputer;

a first outputting terminal to an eighth outputting terminal (P1.0-P1.7) of a first outputting port (P1) and a first outputting terminal (P2.0) of a second outputting port (P2) of said single-chip microcomputer are successively connected with gate electrode circuits of a first MOS FET to a ninth MOS FET (VT1-VT9) of said MOS FET switching constant-current source circuit;

drain electrodes of said first MOS FET to said ninth MOS FET (VT1-VT9) of said MOS FET switching constant-current source circuit are successively connected in series with a first LED to a ninth LED (LED1-LED9) in said left taillight;

an emitted color order of said first LED to said ninth LED (LED1-LED9) is successively red, yellow, white, red, yellow, white, red, yellow and white, wherein:

said first LED to said third LED (LED1-LED3), respectively for displaying red, yellow and white light, are arranged in said first light-emitting zone (I); said fourth LED to said sixth LED (LED4-LED6), respectively for displaying red, yellow and white light, are arranged in said second light-emitting zone (II); and said seventh LED to said ninth LED (LED7-LED9), respectively for displaying red, yellow and white light, are arranged in said third light-emitting zone (III);

a second outputting terminal to an eighth outputting terminal (P2.1-P2.7) of said second outputting port (P2) and a first outputting terminal and a second outputting terminal (P3.0-P3.1) of a third outputting port (P3) of said single-chip microcomputer are successively connected with gate electrode circuits of a tenth MOS FET to an eighteenth MOS FET (VT10-VT18) of said MOS FET switching constant-current source circuit;

drain electrodes of said tenth MOS FET to said eighteenth MOS FET (VT10-VT18) of said MOS FET switching constant-current source circuit are successively connected in series with a tenth LED to an eighteenth LED (LED10-LED18) in said right taillight; and an emitted color order of said tenth LED to said eighteenth LED (LED10-LED18) is successively red, yellow, white, red, yellow, white, red, yellow and white, wherein:

said tenth LED to said twelfth LED (LED10-LED12), respectively for displaying red, yellow and white light, are arranged in said first light-emitting zone (I) of said right taillight; said thirteenth LED to said fifteenth LED (LED13-LED15), respectively for displaying red, yellow and white light, are arranged in said second light-emitting zone (II) of said right taillight; and said sixteenth LED to said eighteenth LED (LED16-LED18), respectively for displaying red, yellow and white light, are arranged in said third light-emitting zone (III) of said right taillight.

2. The full-screen display device of the automobile taillights, as recited in claim 1, wherein a third outputting terminal (P3.2) of said third outputting port (P3) of said single-chip microcomputer is further connected with a sound circuit, wherein:

said third outputting terminal (P3.2) of said third outputting port (P3) of said single-chip microcomputer is connected with a base inputting terminal of a triode switching circuit (VT19); and a collector outputting terminal of said triode switching circuit is connected in series with a sound relay (K).

3. A full-screen display device of automobile taillights, comprising left and right taillights, a linked switch and a light-emitting display controlling circuit, wherein:

said left taillight and said right taillight are respectively divided into a first light-emitting zone (I), a second light-emitting zone (II) and a third light-emitting zone (III), wherein light-emitting diodes (LEDs), respectively for displaying red light, yellow light and white light, are arranged in each said light-emitting zone;

said light-emitting display controlling circuit comprises a signal inputting circuit, a single-chip microcomputer, a metal-oxide-semiconductor field-effect transistor (MOS FET) switching constant-current source circuit, a light-emitting executive circuit and a power source, wherein:

said signal inputting circuit is connected with a signal inputting terminal of said single-chip microcomputer; a signal outputting terminal of said single-chip microcomputer is connected with an inputting terminal of said MOS FET switching constant-current source circuit; and said MOS FET switching constant-current source circuit is connected in series with said LEDs;

an outputting terminal (P3.2) of an outputting port (P3) of said single-chip microcomputer is further connected with a sound circuit, wherein:

said outputting terminal (P3.2) of said outputting port (P3) of said single-chip microcomputer is connected with a base inputting terminal of a triode switching circuit (VT19); and a collector outputting terminal of said triode switching circuit is connected in series with a sound relay (K).

* * * * *